Jan. 20, 1931.　　　G. BACKDAHL　　　1,789,858
TIRE BUILDING MACHINE
Filed April 17, 1924　　3 Sheets-Sheet 1

INVENTOR
GUSTAF BACKDAHL
BY
Wm Wallace White
ATTORNEYS.

Jan. 20, 1931. G. BACKDAHL 1,789,858
TIRE BUILDING MACHINE
Filed April 17, 1924 3 Sheets-Sheet 2

Jan. 20, 1931.  G. BACKDAHL  1,789,858
TIRE BUILDING MACHINE
Filed April 17, 1924  3 Sheets-Sheet 3

INVENTOR
GUSTAF BACKDAHL
BY
Wm Wallace White
ATTORNEYS.

Patented Jan. 20, 1931

1,789,858

UNITED STATES PATENT OFFICE

GUSTAF BÄCKDAHL, OF DJURSHOLM, SWEDEN

TIRE-BUILDING MACHINE

Application filed April 17, 1924. Serial No. 707,020.

The present invention relates to machines for building pneumatic tire casings in accordance with the method whereby the component parts of the tire casing are first assembled and built up into a cylindrical, transversely flat or nearly flat, endless tire band, which is then converted into tire casing shape by forcing the intermediate portion of the band outwardly radially and at the same time moving the edge or bead portions, which are rendered practically unstretchable, towards one another.

The manufacture of tire casings by the above method has heretofore as a rule involved two entirely separate operations, viz: firstly the building up of the flat, endless tire band on a rotable drum from which drum the tire band is then taken off; and, secondly the conversion of this flat, endless band into tire casing shape, which has as a rule been effected by using fluid pressure or by means of expanding cores.

The object of the present invention is chiefly to provide a single tire building machine that is capable of performing both these operations i. e. a machine, that provides a suitable support for building up the flat, endless tire band and that also provides means for converting this tire band into tire casing shape immediately and without moving the band from the machine. The expansion or conversion of the tire band is effected by a novel method, viz. by using centrifugal force, obtained by rotating the tire band at high speed, whereby the intermediate portion of the band is forced outwardly by the centrifugal force, which is preferably increased by pouring a liquid or a finely divided solid on the internal surface of the rotating band. At the same time the unstretchable bead portions are forced to move towards one another.

It is evident that the building of tire casings in accordance with this method will effect a considerable saving in time and labor, and result in a cheaper and better product. Furthermore, the first cost of a machine constructed in accordance with the present invention will be lower than the two machines it substitutes and it will also require considerably less floor space.

With the foregoing and other objects in view, the invention consists in the novel construction, combination and arrangement of parts hereafter fully described and illustrated in the accompanying drawings, forming part hereof and showing the preferred embodiment of the invention, but it is to be understood that changes, variations and modifications, coming within the scope of the matter claimed hereafter, may be resorted to.

Referring to the drawings wherein similar reference numerals indicate like parts in the different figures:—

Figure 1:
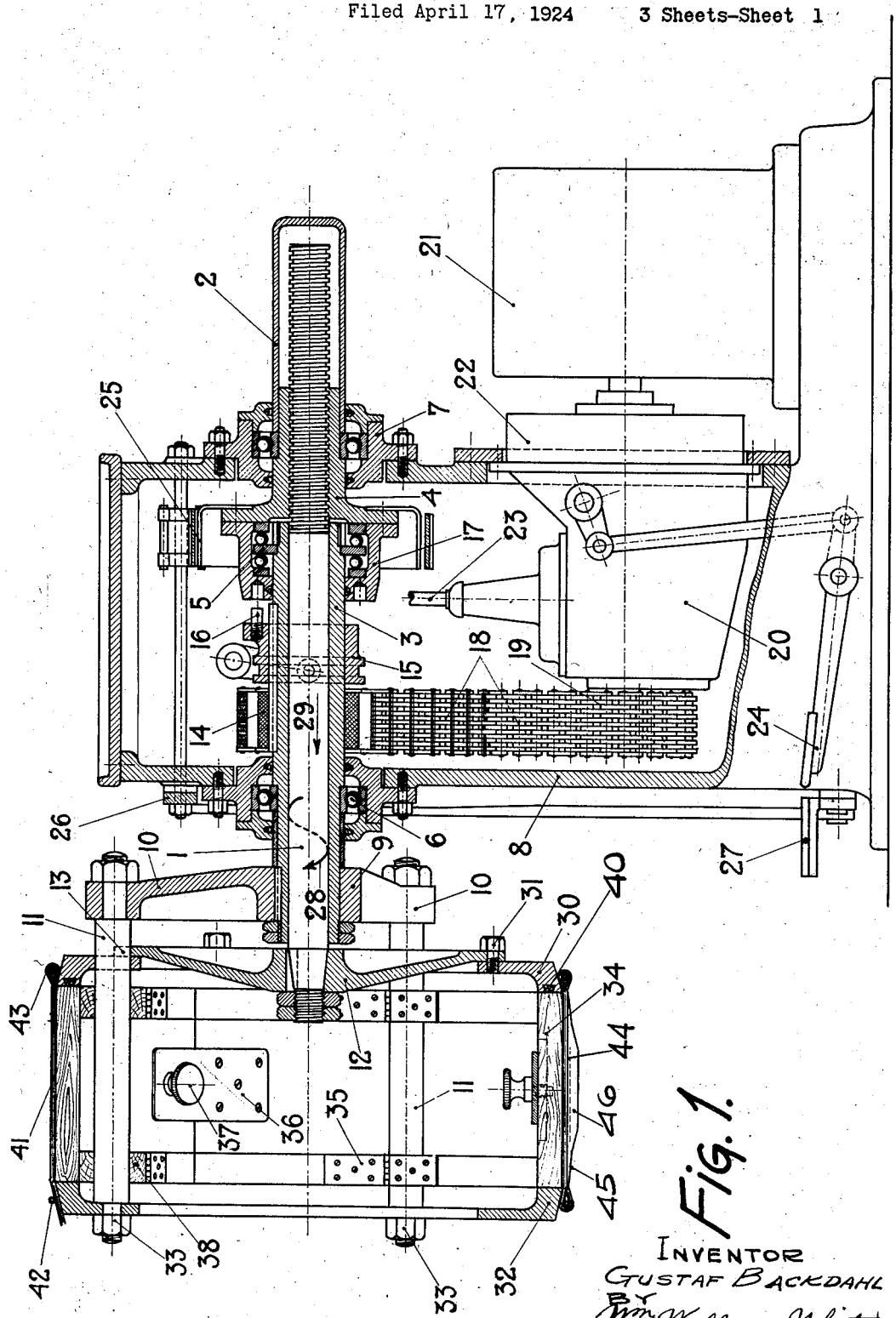
Figure 1 is a longitudinal cross section of the machine.

The following is a brief description of the construction and operation of the machine in its preferred embodiment.

The spindle 1, of which one end is formed as a screw, protected by the sleeve 2, is mounted in a sleeve 3, in which it can be moved axially. The threaded portion of the spindle 1 is supported in the threaded sleeve 4. The sleeves 3 and 4 are rotably connected to one another by the enclosed double-thrust ball bearing 5, and are mounted on the enclosed ball bearings 6 and 7, bolted to the frame 8. A hub 9 is bolted and keyed to the outer end of the sleeve 3, from which hub three arms 10 extend radially, 120° apart, each arm having securely bolted to its end a horizontal guide rod 11. A disc 12 is bolted and keyed to the outer end of the spindle 1. This disc has three notches 13 in its peripheral flange, which notches fit against the guide rods 11.

The sleeves 3 and 4 can be locked to one another by means of the pin coupling or clutch 15 with its pin 16 fitting into a number of holes in the thrust bearing housing 17. The gear 14, which is keyed to the sleeve 3, is driven by a silent chain 18 from the gear 19. This gear is keyed to the driving shaft of the gear box 20, which is of the same construction as an automobile gear box with three speeds forward and reverse. The gear box 20 is driven by the electric motor 21 through a friction clutch 22, operated by the pedal 24. The gear box is operated by a gear shifting lever 23, which is extended outside of the frame 8.

A brake 25 of the external contracting band type has its drum bolted to the flange of the sleeve 4 and is operated by the weighted lever 26 (only shown in cross section) and the pedal 27.

If the sleeve 3 is rotated in the direction indicated by the arrow 28, it is evident that the spindle 1 is also rotated at the same speed and the disc 12 will rotate with the guide rods 11. If the clutch 15 is out of engagement and the brake 25 is gently applied, the sleeve 4 is forced to rotate at a slightly lower speed than the sleeve 3 and due to the screw action the spindle 1 will be forced to move axially in the direction indicated by the arrow 29, at the same time moving the disc 12 along the guide rods 11. The axial thrust between the sleeves 3 and 4 is taken up by the thrust bearing 5.

The bead supporting ring 30 is supported by the three guide rods 11 which run through holes in its flange. The ring 30 is attached to the disc 12 by means of the bolts 31. Another bead supporting ring 32 with practically the same cross section as 30 is bolted to the ends of the three guide rods 11 by means of the nuts 33. The outer surfaces of the rings 30 and 32 are conical.

Figure 2:
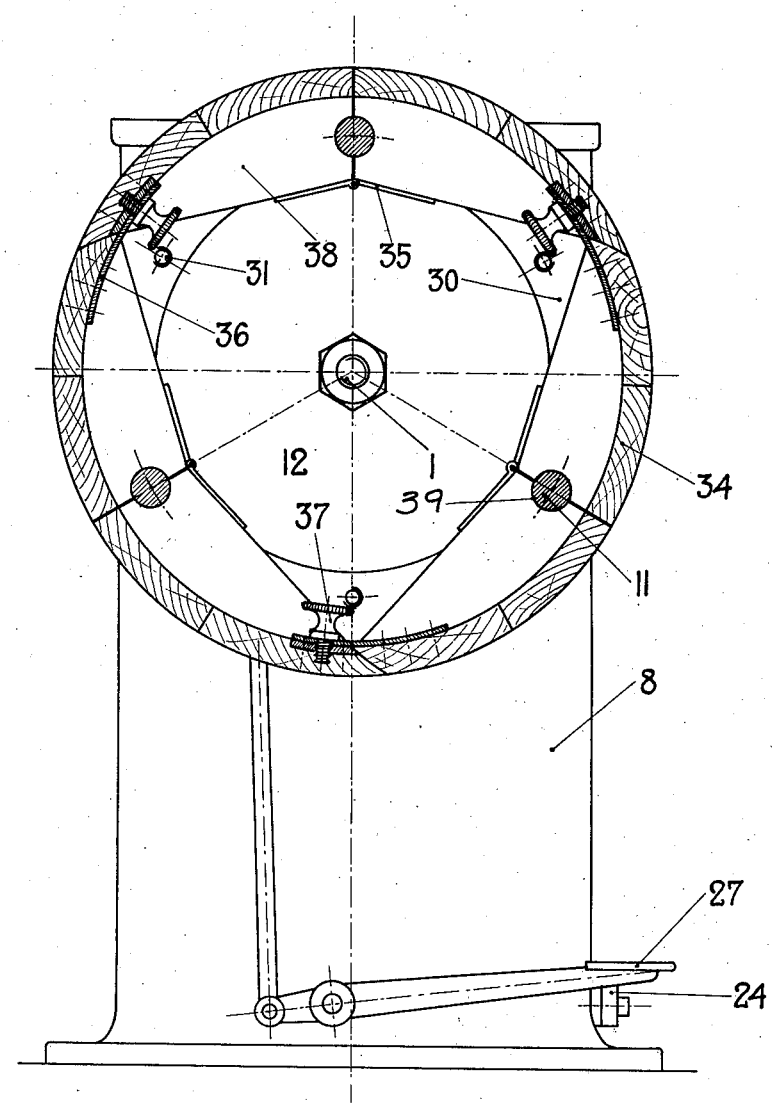
Fig. 2 is an end view with the building drum in cross section.

Between the two bead supporting rings 30 and 32 is mounted a wooden drum 34, consisting of six sections, connected two and two by means of hinges. The free ends of the drum sections are securely connected by means of the lugs 36 and the nuts 37. The drum 34 is supported by the three guide rods 11, which run through holes in the wooden cross bars 38. (See Fig. 2.)

The wooden drum 34 fits exactly between the conical rings 30 and 32 and forms, together with these rings, a sufficiently rigid structure for supporting a flat tire band built up thereon.

The operation of the machine is as follows:—

The bead supporting ring 30 is first fitted on the guide rods 11 and attached to the disc 12 by means of the bolts 31. The drum 34 is then assembled and securely bolted together and then mounted on the guide rods 11, whereupon the bead supporting ring 32 is placed in position and secured to the guide rods 11 by means of the nuts 33. The pin coupling 15 being disengaged, the drum 34 is then firmly pressed between the rings 30 and 32 by turning the drum in the direction indicated by the arrow 28 with the brake 25 applied, and then engaging the pin clutch 15.

The machine is now ready for the building up of a tire band on the drum formed by the bead supporting rings 30 and 32 and the wooden drum 34. The rubberized material now forms a cylindrical, endless band with its edges slightly conical, same being supported by the conical bead supporting rings 30 and 32. The two bead cables 42, consisting of several strands of wire, wrapped with rubberized fabric and cemented, are then placed in proper position. This is easily effected on account of the edges of the tire band being conical. The bead cables being accurately positioned, the edge portions of the tire band are turned over upon the bead cables and are rolled down so as to form the tire beads 43. Other component parts of the tire such as a breaker strip 44, side wall rubber 45 and tread rubber 46 are then put on (see Fig 3). The side rings 47 and 48 are then bolted to the bead supporting rings 30 and 32, and the wooden drum 34 is disassembled and removed. The band is now supported only by the beads 43, which rest on the bead supporting rings and are prevented from slipping off the rings due to their being conical. The beads are rendered practically unstretchable due to the bead cables 42.

Figure 3:
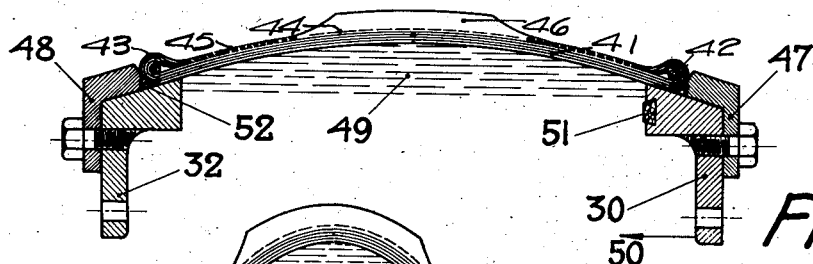
Fig. 3 is a cross section of the tire band immediately after the commencement of the centrifugal operation.
Figure 4:
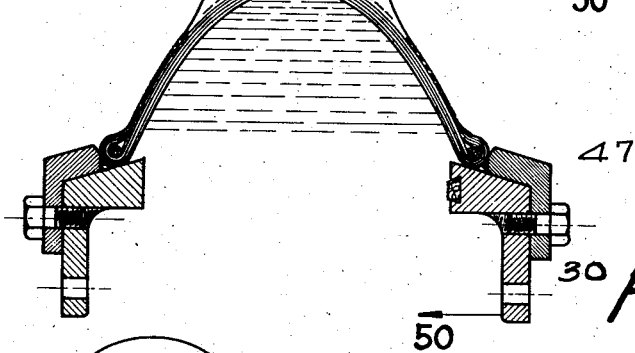
Fig. 4 is a cross section of the tire band in a more advanced stage of the centrifugation.

The tire band is now ready to be subjected to centrifugal action in order to make it assume a rounded tire casing shape. The motor 21 is started with the gear shifting lever in low speed position and the pin clutch 15 engaged. The speed is then increased to intermediate and high, and the tire band is now rotating at a relatively high speed. The centrifugal force now causes the intermediate portion of the band, which portion is stretchable, to swell out radially. The pin coupling is then disengaged and the brake 25 is gently applied, forcing the sleeve 4 to rotate at a lower speed than the sleeve 3, whereby the spindle 1 is forced to move slowly in the direction of the arrow 29. At the same time a suitable quantity of water 49 is poured into the internal surface of the rotating tire band. This water forms a thin layer on the inside of the band and highly increases the centrifugal force, acting on the tire band. (Fig. 3). Due to the screw action of the spindle 1 in the sleeve 4 the bead supporting ring 30 is moved slowly towards the ring 32 and the tire band is consequently forced to curve out radially more and more as shown in Fig. 4.

Figure 5:
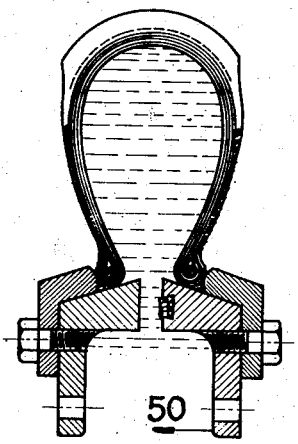
Fig. 5 is a cross section of the tire band immediately before the end of the centrifugal action, and, Fig. 6 is a cross section of the tire band after the completion of the centrifugal operation, showing the tire band fully converted into tire casing shape and ready to be placed in the vulcanizing mold.

In Fig. 5 the ring 30 has moved very close to the ring 32. The tire band has now assumed a cross section similar to a horse-shoe. At this moment the clutch 22 is released and the machine continues to rotate on account of the inertia of its revolving parts. After a few moments the rings 30 and 32 are in contact with one another and are firmly pressed together. Consequently the spindle 1 can no longer move axially, which forces the sleeve 3 and thereby also the brake drum 25 to rotate at the same speed.

On account of the brake 25 the machine is brought to a standstill in a few moments.

By means of the packing ring 51, set in the ring 30, a fluidtight joint is obtained between the rings 30 and 32. By means of the packings 52 the joints between the tire beads and the side rings 47 and 48 are also made fluidtight. The interior of the tire is consequently perfectly sealed at the moment rotation ceases.

Figure 6:
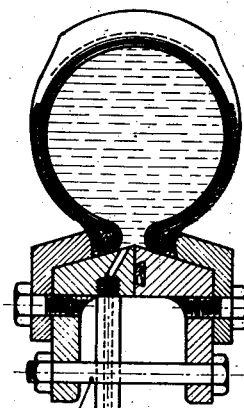

The walls of the tire which were considerably stretched during the latter period of the centrifugal operation will contract as soon as the centrifugal force ceases and the tire will assume a circular cross section around the water enclosed in the interior. The fluid pressure in the tire may then be adjusted by means of the valve 54. (Fig. 6).

The bead portions of the tire, which were resting flat on the bead supporting rings at the beginning of the centrifugal operation have been gradually turned through an angle of about 90° during such operation and have finally assumed practically the position they will occupy during vulcanization.

The bead supporting rings 30 and 32 are then securely clamped together by means of a number of bolts 53 and are then released from the guide rolls 11 and the disc 12 by loosening the nuts 33 and the bolts 31. The inflated tire together with the rings 30 and 32 and the side rings 47 and 48 are then taken away from the machine for eventual further operations and final vulcanization. The machine is then ready for starting the building up of a new tire by repeating the operations outlined above.

I have found that by employing a suitable liquid, such for example as water, or solid, such for example as "shot", the speed at which it is necessary to rotate the tire band to obtain the desired effect is considerably lower than when such a liquid or solid is not employed.

When employing such a centrifugal assisting body in liquid form, it is necessary to treat, such, for example, by coating with a thin layer of rubber, the first or inside ply of the tire band, so as to prevent such liquid from entering the band with consequent damage.

When employing a centrifugal assisting body in solid form, it will usually be found advantageous to subject the shaped tire casing on the completion of the centrifugal action to a certain amount of pressure, such as air pressure, and this can be accomplished through the aid of the valve 54 and this may take place either in the presence of the said body, or the latter can be first removed if found preferable.

It is evident that the machine described above may also be used only for converting a flat tire band into tire casing shape. In such a case the drum 34 can be omitted as the band is built on a separate machine and then placed on the bead supporting rings 30 and 32 for the centrifugal operation described above.

In the foregoing the preferred embodiment of the machine has been described and it has been assumed that the tire built by the machine has been a "straight-side" or "wire-edge" tire, i. e. a tire the beads of which contain bead cores which are rendered unstretchable by means of strong steel wires or cables.

However, the machine may also be used for making tires of other types, for instance "clincher" or "beaded edge" tires. This type of tire has usually its bead cores made of semi-hard rubber, which permits the beads to stretch to a considerable degree.

When building a "beaded edge" tire in accordance with this invention means should be provided in order to force the soft and stretchable beads of the tire band to maintain substantially a constant diameter during the centrifugal operation, when the intermediate portion of the band is expanded radially outward. This can be accomplished for example, by extending the first two plys of the tire band and clamping them down between the rings 30 and 32 and the side rings 47 respectively at either side of the machine.

What I claim and desire to secure by Letters Patent is:

1. A machine for forming a tire casing from a build up tire band comprising means for supporting the edges of the band, controllable means for positively moving said supporting means towards one another, and means for rotating the band at such speed as to cause the centrifugal action to force the portion of the band intermediate its edges outwardly.

2. A machine for forming a tire casing from a built up tire band comprising means for supporting the edges of the band, means for positively moving said supporting means towards one another, and means for rotating the band and a body applied to the same at such speed as to cause the centrifugal action to force the portion of the band intermediate its edges outwardly.

3. A machine for building a tire casing comprising means upon which the casing may be assembled in band form, means for supporting the edges of the band, and means for rotating the band at such speed as to cause the centrifugal action to force the portion of the band intermediate its edges outwardly.

4. A machine for building a tire casing comprising means upon which the casing may be assembled in band form, means for supporting the edges of the band, and means for rotating the band and a body applied to the same at such speed as to cause the centrifugal action to force the portion of the band intermediate its edges outwardly.

5. A machine for building a tire casing comprising means upon which the casing may be assembled in band form, means for supporting the edges of the band, means for positively moving said supporting means towards one another, and means for rotating the band at such speed as to cause the centrifugal action to force the portion of the band intermediate its edges outwardly.

6. A machine for building a tire casing comprising means upon which the casing may be assembled in band form, means for supporting the edges of the band, means for positively moving said supporting means towards one another, and means for rotating the band and a body applied to the same at such speed as to cause the centrifugal action to force the portion of the band intermediate its edges outwardly.

7. A machine for building a pneumatic tire casing from a tire band comprising means upon which the band can be built up, means for subjecting said band to centrifugal action in the presence of a body, and means for sealing the body within the formed tire casing on the completion of the centrifugal operation.

8. A machine for building a pneumatic tire casing from a tire band comprising band-supporting means, means for subjecting said band to centrifugal action and for closing up the edges of said band, said latter means including a screwed shaft and means for controlling the advancement of said shaft.

9. A machine for building a pneumatic tire casing from a tire band comprising a collapsible and removable drum like structure on which the band can be built up, rings disposed at either side of said structure for receiving and supporting the beads of the band, and means for subjecting said rings and the band carried thereby to centrifugal action after the drum has been collapsed and removed, for the purpose stated.

10. A machine for building a pneumatic tire casing from a tire band comprising two sets of spaced-apart bead supporting rings, a collapsible and removable drum disposed between said sets of rings on which the band can be built up, means for subjecting said tire band to centrifugal action after the removal of said drum, and means for advancing one set of bead supporting rings towards the other set to convert the band into a tire casing.

11. A machine for building a pneumatic tire casing from a tire band comprising band-supporting means, means for subjecting said band to centrifugal action and for closing up the edges of said band, said latter means including a screwed shaft, a pair of sleeves on said shaft and a brake adapted to act in one of said sleeves to cause them to rotate at different speeds to advance the shaft.

12. A machine for building a pneumatic tire casing from a tire band comprising a collapsible and removable drum-like structure on which the band can be built up, rings disposed at either side of said structure for receiving and supporting the beads of the band, and means for subjecting said rings and the band carried thereby to centrifugal action after the drum has been collapsed and removed, and means for advancing one of said rings toward the other ring.

13. A machine for building a pneumatic tire casing from a tire band comprising a collapsible and removable drum-like structure on which the band can be built up, conically surfaced, rings disposed at either side of said structure for receiving and supporting the beads of the band, and means for subjecting said rings and the band carried thereby to centrifugal action after the drum has been collapsed and removed, and means for advancing one of said rings toward the other ring.

14. A machine for forming a pneumatic tire casing from a tire band comprising a screwed spindle, arms extending radially therefrom, guide rods carried by said arms, two sets of bead supporting rings carried respectively by said radial arms and said guide rods, the former rings being adapted to slide along said guide rods, a collapsible drum interposed between said sets of bead supporting rings on which the tire band can be built up, means for advancing the spindle to bring said two sets of bead supporting rings together after the drum has been collapsed and removed, and means for rotating said parts to submit the band to a centrifugal operation to form the tire casing therefrom.

15. A machine for building a pneumatic tire casing from a tire band comprising a spindle, a plurality of arms extending therefrom, a set of rings for supporting one bead of said band fixed against longitudinal movement, a second set of rings for supporting the other bead of said band adapted to be advanced longitudinally towards said first-mentioned set, and means for subjecting said band to centrifugal action for advancing said second set of rings to impart to the band a rounded tire casing shape.

16. A machine for building a pneumatic tire casing from a tire band comprising two sets of spaced-apart bead supporting rings, side rings connected to said sets of rings, means for subjecting the band and its supports to centrifugal action in the presence of a liquid and for advancing said sets of rings until they meet, means for forming a fluid-tight joint between the tire and its supports on the meeting of said rings, and means for locking the latter in position to maintain said fluid-tight joint.

17. A machine for building a pneumatic tire casing from a tire band comprising means upon which the band can be built up, means for subjecting said band to centrifugal action in the presence of a liquid, and for advancing the one bead of the band towards the other bead thereof, and means for sealing the liquid within the formed tire on the completion of said advancement.

18. The method of forming a built up tire band into a tire casing which consists in rotating the band and forcing the portion of the band intermediate its edges outwardly by centrifugal action due to such rotation while at the same time positively advancing the two edges of the band towards one another to positions inwardly of the parallel planes defined by the side walls of the casing.

19. The method of forming a built up tire band into a tire casing which consists in rotating the band and a body applied to the same and forcing the portion of the band intermediate its edge portions outwardly by centrifugal action due to such rotation while at the same time positively advancing the two edges of the band towards one another to positions inwardly of the parallel planes defined by the side walls of the casing.

20. The method of forming a tire casing which consists in building up an endless tire band, and without removing said band from the place in which it is built up rotating said band as a circular loop around the axis of such loop, and forcing the portion of the band intermediate its edge portions outwardly by centrifugal action due to such rotation.

21. The method of forming a tire casing which consists in building up an endless tire band, and without removing said band from the place in which it is built up, rotating said band as a circular loop around the axis of such loop, applying a body to the internal surface of the band and rotating such body with the band, and forcing the portion of the band intermediate its edge portions outwardly by centrifugal action due to such rotation of the band and the body.

22. The method of forming a tire casing which consists in building up an endless tire band, and without removing said band from the place in which it is built up rotating said band as a circular loop around the axis of such loop, and forcing the portion of the band intermediate its edges outwardly by centrifugal action due to such rotation while advancing at the same time the two edges of the band towards one another to positions inwardly of the parallel planes defined by the side walls of the casing.

23. The method of forming a tire casing which consists in building up an endless tire band, and without removing said band from the place in which it is built up rotating said band as a circular loop around the axis of such loop, applying a body to the internal surface of the band and rotating such body with the band and forcing the portion of the band intermediate its edges outwardly by centrifugal action due to such rotation of the band and the body while advancing at the same time the two edges of the band toward one another to position inwardly of the parallel planes defined by the side walls of the casing.

24. A machine for forming a tire casing from a built-up tire band comprising means for supporting the edges of said band, means for rotating said supporting means at such speed as to cause the centrifugal action to force the portion of the band intermediate its edges outwardly and means for positively moving said supporting means toward one another during the rotation of the band to position said edges inwardly of the parallel planes defined by the side walls of said casing.

In testimony whereof I have signed my name to this specification.

GUSTAF BÄCKDAHL.